(12) United States Patent
Kamiya et al.

(10) Patent No.: US 8,780,171 B2
(45) Date of Patent: Jul. 15, 2014

(54) VIDEO SIGNAL PROCESSOR AND VIDEO SIGNAL PROCESSING METHOD WITH MARKERS FOR INDICATING CORRECT COMPONENT CONNECTION

(75) Inventors: Koji Kamiya, Kanagawa (JP); Mayuki Hashi, Kanagawa (JP); Kinichi Ootsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 12/970,302

(22) Filed: Dec. 16, 2010

(65) Prior Publication Data

US 2011/0149023 A1 Jun. 23, 2011

(30) Foreign Application Priority Data

Dec. 22, 2009 (JP) ................................. 2009-291062

(51) Int. Cl.
*H04N 13/00* (2006.01)

(52) U.S. Cl.
USPC .......................................................... 348/42

(58) Field of Classification Search
CPC .............. H04N 13/00; H04N 13/0048; H04N 13/0059; H04N 13/0066
USPC .......................................................... 348/42
IPC .................................................... H04N 13/00
See application file for complete search history.

(56) References Cited

U.S. PATENT DOCUMENTS

| 5,856,843 | A | * | 1/1999 | Muramoto | 348/52 |
| 6,268,881 | B1 | * | 7/2001 | Muramoto | 348/55 |
| 8,049,775 | B2 | * | 11/2011 | Maeda | 348/47 |
| 2007/0046776 | A1 | * | 3/2007 | Yamaguchi et al. | 348/53 |
| 2008/0284843 | A1 | * | 11/2008 | Jo | 348/51 |
| 2009/0142041 | A1 | * | 6/2009 | Nagasawa et al. | 348/42 |
| 2011/0063727 | A1 | * | 3/2011 | Redmann et al. | 359/464 |

FOREIGN PATENT DOCUMENTS

JP 2002 369219 12/2002

* cited by examiner

*Primary Examiner* — Jay Au Patel
*Assistant Examiner* — Francis G Geroleo
(74) *Attorney, Agent, or Firm* — Frommer Lawrence & Haug LLP; William S. Frommer; Ellen Marcie Emas

(57) ABSTRACT

Disclosed herein is a video signal processor including: a combining process section adapted to superimpose a first marker signal on a first video signal component at a specific position and superimpose a second marker signal on a second video signal component at roughly the same position as the specific position; and a control section adapted to control the condition of superimposition of the first and second marker signals so that an image appears to indicate that the first and second marker signals are combined correctly when the first and second video signal components are combined in a correct phase relationship, and so that an image appears to indicate that the first and second marker signals are combined incorrectly if the first and second video signal components are combined in an incorrect phase relationship.

11 Claims, 8 Drawing Sheets

FIG.3A
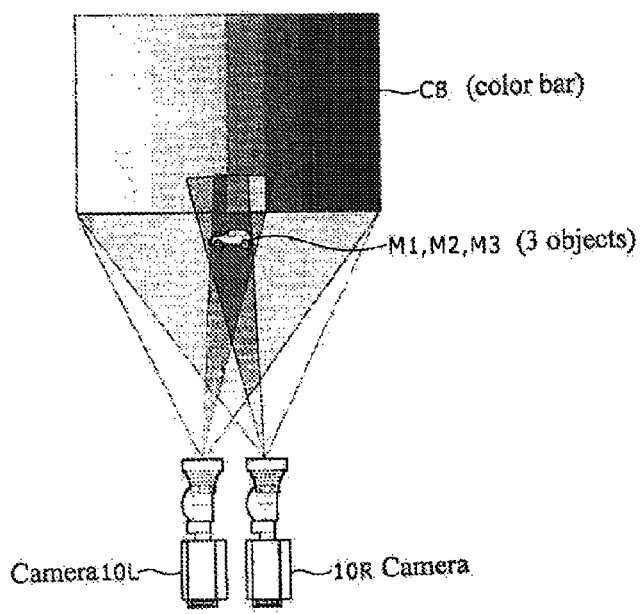
FIG.3B    FIG.3C
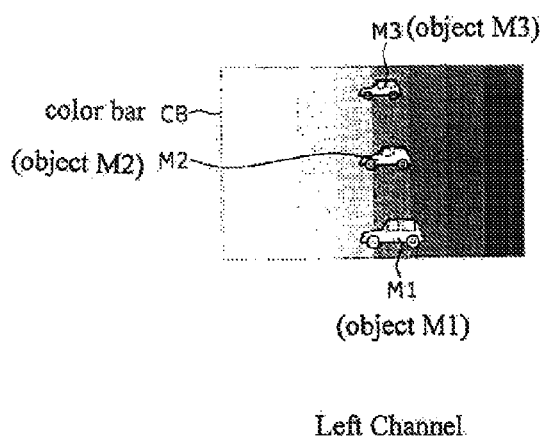   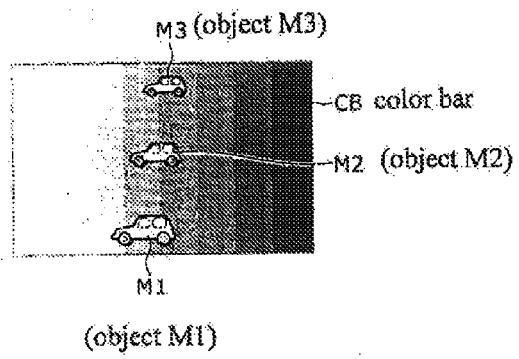
Left Channel    Right Channel Correct Phase Relationship Incorrect Phase Relationship odd and even lines combined odd lines even lines

VIDEO SIGNAL PROCESSOR AND VIDEO SIGNAL PROCESSING METHOD WITH MARKERS FOR INDICATING CORRECT COMPONENT CONNECTION

BACKGROUND OF THE INVENTION

1. Field of the Invention

The present invention relates to a video signal processor and video signal processing method and more particularly to a technique suitable for processing a stereoscopic video signal made up of left and right two channel signals and dual link video signals.

2. Description of the Related Art

A stereoscopic video signal adapted to display a stereoscopic image on a display device includes a left channel video signal, i.e., an image for the left eye, and a right channel video signal, i.e., an image for the right eye. The left and right channel video signals are displayed simultaneously on the same display surface and processed in such a manner that the user's left and right eyes can selectively view the images, thus allowing for the user to perceive the images stereoscopically.

In order to obtain such a stereoscopic video signal, two video camcorders are normally used that are positioned one on the left and another on the right with some spacing therebetween for shooting. Although one-piece camcorders for stereoscopic shooting have come along, even in this case, the camcorders include an imaging section corresponding to two video camcorders to separately obtain left and right channel video signals.

On the other hand, a new video signal standard has been recently proposed as a technique completely different from stereoscopic display. In this standard, the number of pixels making up a frame has been significantly increased. For example, a video signal called a so-called 4K image is proposed. Offering an ultrahigh resolution of 4096 pixels across and 2160 pixels down per frame, this video signal is on its way to becoming commercialized, for example, for movies shown in movie theaters.

This video signal with an ultrahigh resolution contains an extremely large amount of data, requiring an extremely high transmission rate to transmit the video signal as it is. Therefore, the video signal is split into at least two paths for transmission. That is, the source and destination devices are connected by two cables, for example, in the dual link HD-SDI standard. Then, the video signal of each frame is divided into two paths for each horizontal line. The divided video signal of one path is transmitted by one cable, and the video signal of the other path by the other cable. The two paths of video signals received on the receiving side are combined and restored to the original 4K image or other video signal with an ultrahigh resolution.

As described above, splitting a video signal into two paths approximately halves the transmission rate for each path, thus ensuring proper transmission of video signals with an ultrahigh resolution.

Japanese Patent Laid-Open No. 2002-369219 (hereinafter referred to as Patent Document 1) discloses the addition of an identification code for discrimination to each of two paths of video signals if a single video signal is split into two paths of video signals for transmission.

SUMMARY OF THE INVENTION

Incidentally, irrespective of whether a video signal is made up of two stereoscopic channels or split into two paths of video signals to reduce the transmission rate, the image of each channel (path) is a signal apparently extremely similar to that of the other channel (path). For example, therefore, if a two-channel stereoscopic video signal is displayed with the left and right channels in reverse by mistake, it is difficult to notice, at first glance, from the content of the image displayed that the left and right channels are reversed although the stereoscopic display is disturbed.

Even if dual link video signals are input with their paths reversed, this only causes the adjacent horizontal lines to appear reversed. Unless each pixel is enlarged, it is difficult to notice that two paths of video signals are in a reverse order.

As described above, when a video signal is split into two channels or paths for transmission, it is often likely that the phase of each channel or path may be inverted due, for example, to erroneous connection of the cable partway through the route. However, it has been difficult to readily notice such an inversion from the displayed image. In particular, a monitor with a relatively small screen size may be used for verification of images during shooting on site or editing. As a result, it is difficult to recognize an interchange of adjacent horizontal lines with such a small monitor.

If the video program is completed with the interchange of two paths of video signals left unnoticed, it will be undesirably necessary, for example, to redo the editing.

A possible solution to this problem would be to add an identification code to each of two paths of video signals so that the receiving device can identify the identification codes as described, for example, in Patent Document 1. However, the use of identification codes requires that the receiving device identify the identification codes, making it impossible to address this need if the device is unable to detect these codes.

It is desirable to easily determine, from the displayed image, that two channels or paths of video signals are combined in an incorrect phase relationship.

The present invention superposes a first marker signal on a first video signal component at a given position and superposes a second marker signal on a second video signal component at a position approximately the same as the given position.

Then, in order to control the condition of superposition of the marker signals, an image appears to indicate that the first and second marker signals are combined correctly when the first and second video signal components are combined in a correct phase relationship, and an image appears to indicate that the first and second marker signals are combined incorrectly if the first and second video signal components are combined in an incorrect phase relationship.

The present invention makes it possible to determine whether the two video signal components are combined in a correct or incorrect phase relationship by simply viewing the displayed images of the video signals based on the display statuses of the marker signals superposed on the two video signal components.

The present invention makes it possible to determine whether two video signal components are combined in a correct or incorrect phase relationship by simply viewing the displayed images of the video signals based on the display statuses of the marker signals superposed on the two video signal components. This eliminates the need for a circuit adapted to identify the video signals, thus making it possible to determine, in an easy and reliable manner, whether the video signals are combined in a correct phase relationship.

BRIEF DESCRIPTION OF THE DRAWINGS

FIGS. 3A to 3C are explanatory diagrams respectively illustrating a virtual shooting condition, a left channel image, and a right channel image according to the first embodiment of the present invention;

DETAILED DESCRIPTION OF THE PREFERRED EMBODIMENTS

Figure 1:
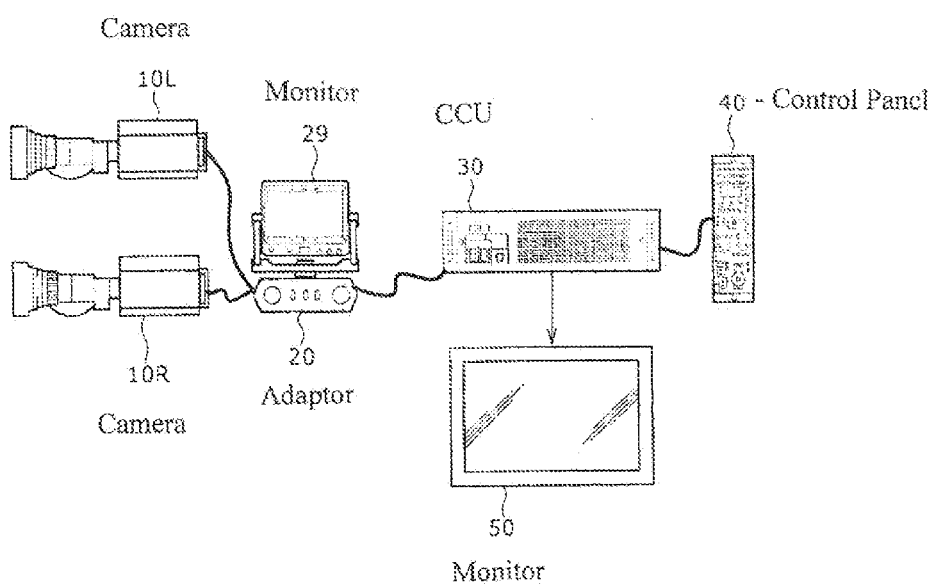
FIG. 1 is an explanatory diagram illustrating an example of connections according to a first embodiment of the present invention.

A description will be given below of the embodiments of the present invention with reference to the accompanying drawings in the following order:
1. First embodiment
1.1 Connections (FIG. 1)
1.2 Device configuration (FIGS. 2A to 2C)
1.3 Combined status of marker and video signals and display status of combined signal (FIGS. 3A to 4B)
2. Second embodiment
2.1 Connections (FIG. 5)
2.2 Device configuration (FIG. 6)
2.3 Combined status of marker and video signals and display status of combined signal (FIGS. 7A to 10B)
[1. First Embodiment]

A description will be given below of a first embodiment of the present invention with reference to FIGS. 1 to 4B.

In the first embodiment, the present invention is applied to a stereoscopic video signal. That is, a stereoscopic video signal includes a left channel video signal, i.e., a first video signal component, and a right-channel video signal, i.e., a second video signal component, allowing for the video signal of each channel to be processed.

[1.1 Connections]

A description will be given first of an example of connections according to the present embodiment with reference to FIG. 1.

In this example, a stereoscopic video signal includes a left channel video signal, i.e., an image for the left eye, and a right-channel video signal, i.e., an image for the right eye. The two video signals are obtained by imaging respectively with different camera devices 10L and 10R.

The left and right channel video signals obtained respectively by the left and right channel camera devices 10L and 10R are supplied to a camera control device 30 through an adapter device 20. The camera control device 30 is a controller called a camera control unit (CCU) and operated, for example, with a control panel 40. A monitoring device 29 is connected to the adapter device 20, and a monitoring device 50 to the camera control device 30. An unshown recorder or transmitter is connected to the camera control device 30 to record or deliver the video signal obtained by the camera devices 10L and 10R.

The connection between each of the camera devices 10L and 10R and the adapter device 20 and that between the adapter device 20 and camera control device 30 are, for example, made separately using left and right channel video signal transmission cables. Alternatively, the stereoscopic video signals may be combined into a single-path video signal for transmission with a single transmission cable.

In the present embodiment, specific marker signals are combined with the respective left and right channel video signals by superposition with the devices connected as illustrated in FIG. 1. The combining process of the marker signals on the video signals may be carried out in any of the devices shown in FIG. 1. That is, the marker signals are superposed on the respective video signals in the camera devices 10L and 10R. Alternatively, the marker signals may be superposed on the respective video signals in the adapter device 20. Still alternatively, the marker signals may be superposed on the respective video signals in the camera control device 30.

It should be noted that, in order to stereoscopically view the images on the monitoring devices 29 and 50, the video signals must be processed accordingly. However, a publicly known configuration is applicable for stereoscopic viewing on the display side. Therefore, the description thereof is omitted here.

[1.2 Device Configuration]

Figure 2A:
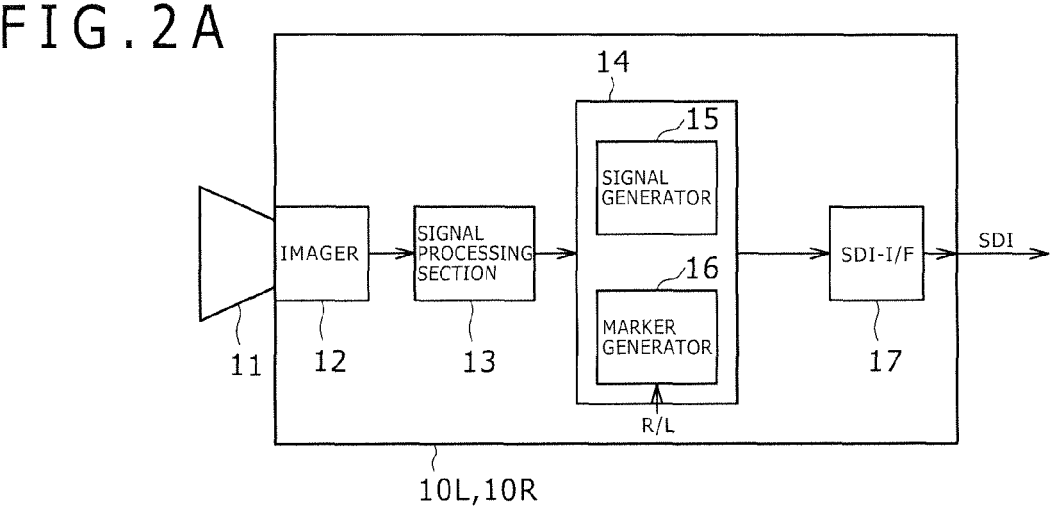
FIGS. 2A to 2C are block diagrams illustrating an example of device configuration according to the first embodiment of the present invention.
Figure 2B:
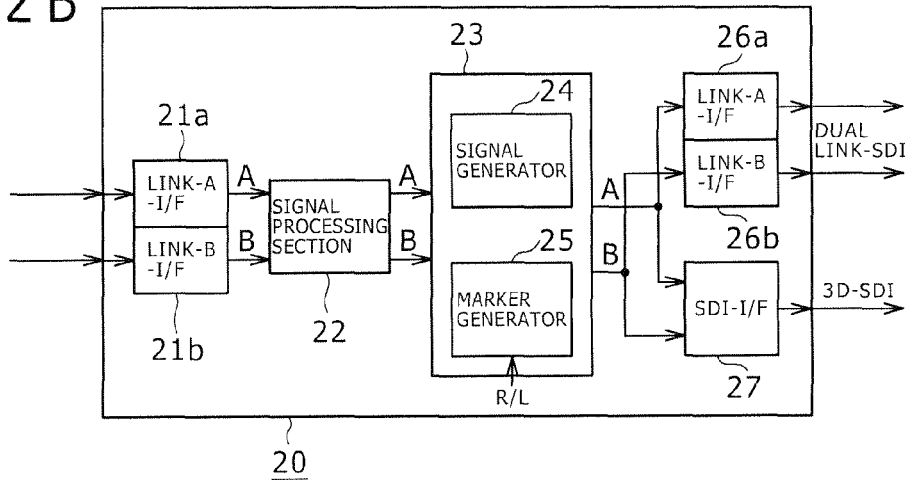
Figure 2C:
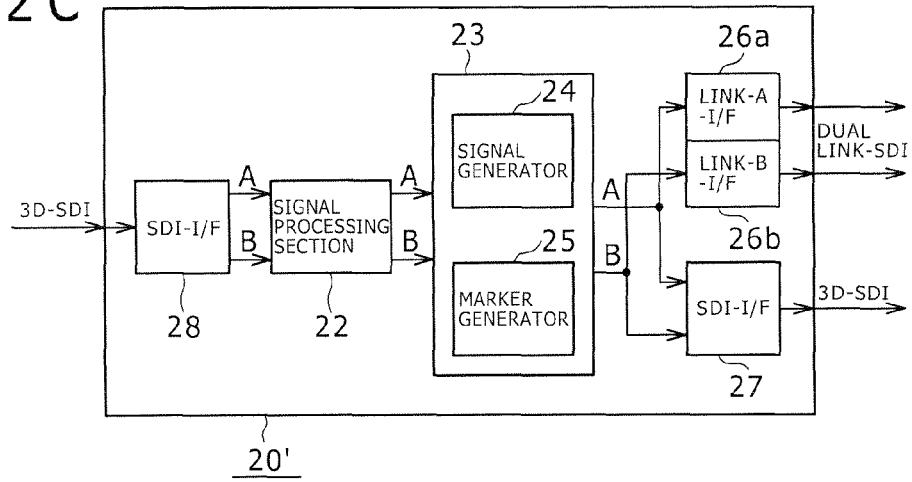

FIGS. 2A to 2C are block diagrams illustrating a configuration example of the devices related to the processes according to the present embodiment. FIG. 2A illustrates a device configuration for combining the video signals with the marker signals in the camera devices 10L and 10R. FIG. 2B illustrates a device configuration for combining the video signals with the marker signals in the adapter device 20. Further, FIG. 2C illustrates, as a modification example, a device configuration for combining the video signals with the marker signals in a different adapter device 20'.

FIG. 2A illustrates the configuration of the camera devices 10L and 10R. The camera device 10L and 10R are basically identical in configuration. Therefore, FIG. 2A illustrates a single camera device.

As illustrated in FIG. 2A, each of the camera devices 10L and 10R obtains an electric imaging signal by capturing image light that falls on an imager 12 via a lens 11. A variety of solid-state imaging elements are applicable as the imager 12 including CCD (Charge Coupled Device) and CMOS (Complementary Metal Oxide Semiconductor) imagers.

A signal processing section 13 performs necessary processes on the imaging signal supplied from the imager 12, thus converting the imaging signal into a video signal in a given format. The converted video signal is supplied to a combining process section 14 where the video signal is combined with a marker signal.

The combining process section 14 includes a signal generator 15 and marker generator 16. The signal generator 15 generates predetermined video signals including test pattern signal. The marker generator 16 generates a marker signal that causes objects serving as marks to appear in an image. The marker generator 16 combines a marker signal with the image at the position specified by the camera device control section (not shown). A marker signal may be combined with an image derived from the video signal obtained as a result of imaging or with an image of a test pattern signal generated by the signal generator 15.

On the other hand, it is possible to select whether to combine a marker signal with a video signal at a left or right channel position under instruction from the control section. In the case of the camera device 10L adapted to obtain a video signal for the left channel, the combining process section 14 is set in such a manner that a marker signal is combined with a video signal at a position for the left channel. In the case of the camera device 10R adapted to obtain a video signal for the right channel, the combining process section 14 is set in such a manner that a marker signal is combined with a video signal at a position for the right channel.

It should be noted that the combining process section 14 combines marker and video signals only when instructed to do so by the control section of the camera device. The combining process section 14 may be instructed to combine marker and video signals by a command issued from other device such as the control panel 40 shown in FIG. 1.

The video signal output from the combining process section 14 is output to external equipment from an interface section 17.

A description will be given next of a configuration for combining marker and video signals in the adapter device 20 with reference to FIG. 2B.

The adapter device 20 receives video signals, transmitted from the two camera devices 10L and 10R, with interface sections 21a and 21b, respectively, and supplies these video signals to a signal processing section 22. It should be noted that the transmission lines for left and right channel video signals are shown as paths A and B, respectively, in FIG. 2B.

The signal processing section 22 performs necessary processes on the video signals of the respective channels, supplying the resultant signals to a combining process section 23. The combining process section 23 combines the left channel video signal with a left marker signal and the right channel video signal with a right marker signal. At this time, the combining process section 23 determines, under instruction from the unshown control section of the adapter device 20, which of the paths A and B of video signals is used as the left channel video signal and the other as the right channel video signal. If some kind of identification code is added to each of the video signals to indicate that the signal is for the left or right channel, the video signals are combined with marker signals according to the channels identified by the identification codes.

The video signals output from the combining process section 23 are output to the device at the subsequent stage from interface sections 26a and 26b or an interface section 27. Each of the interface sections 26a and 26b outputs the left or right channel video signal as a dual link SDI signal of one or the other path. The interface section 27 outputs the video signal as a signal compliant with 3D-SDI, a stereoscopic video signal standard.

Further, the video signal output from the combining process section 23 is supplied to the monitoring device 29 to display an image although the monitoring device 29 is not shown in FIG. 2B.

FIG. 2C illustrates a configuration example of the different adapter device 20'.

This adapter device 20' is configured to receive a 3D-SDI signal, i.e., a stereoscopic video signal. Therefore, it is necessary to generate a 3D-SDI signal in the camera device or other device at the previous stage. Therefore, this example assumes that the camera devices different from those shown in the device configuration of FIG. 1 are available.

In the adapter device 20' shown in FIG. 2C, an interface section 28 receives the 3D-SDI signal, separating the left channel video signal (path A) and the right channel video signal (path B) and supplying the respective separated video signals to the signal processing section 22. The signal processing section 22 performs necessary processes on the respective channel signals, supplying the resultant signals to the combining process section 23. The combining process section 23 combines the left channel video signal with a left marker signal and the right channel video signal with a right marker signal. The configuration beyond the combining process section 23 is the same as that of the adapter device 20 shown in FIG. 2B.

It should be noted that although the configurations of the camera device and adapter device are shown in FIGS. 2A to 2C, a processing section corresponding to the combining process section 14 or 23 may be provided in other video signal processing device such as the camera control device 30 shown, for example, in FIG. 1 so that video signals are combined with marker signals.

[1.3 Combined Status of Marker and Video Signals and Display Status of Combined Signal]

A description will be given next of the combined status of video and marker signals with reference to FIGS. 3A to 4B.

FIGS. 3A to 3C are explanatory diagrams respectively illustrating a virtual shooting condition with the two camera devices 10L and 10R, a left channel image, and a right channel image. In the example illustrated in FIGS. 3A to 3C, three objects M1, M2 and M3 displayed by marker signals are shown to be superimposed on an image CB of a color bar signal, i.e., a test pattern.

As illustrated in FIG. 3A, when the two camera devices 10L and 10R are used for shooting, the video signals of the respective channels are combined with marker signals in such a manner that the three objects M1, M2 and M3 are located roughly at the center.

In the present example, the three objects M1, M2 and M3 displayed by the marker signals are cars sized differently from one another, and the size relationship M1>M2>M3 holds between these objects. Further, as illustrated in FIGS. 3B and 3C, the object M1 appears at the bottom in the center, the object M2 at the middle in the center, and the object M3 at the top in the center.

Then, the left channel image shown in FIG. 3B and the right channel image shown in FIG. 3C are displayed on a monitoring device simultaneously or in a time-divided way so that the image of each channel can be viewed by the left and right eyes. At this time, the positions of the objects M1, M2 and M3 at the time of combining with the video signals of the respective channels are set so that the objects M1, M2 and M3 are at different distances from the user. The positions of the objects are set, for example, under control of the control section in the device adapted to combine the video signals with marker signals.

As for where the objects M1, M2 and M3 are visible, the largest object M1 here is displayed more forward than the surface where the color bar signal is displayed (i.e., monitor screen). Then, the second largest object M2 is displayed at roughly the same position as the surface where the color bar signal is displayed. Further, the smallest object M3 is displayed more backward than the surface where the color bar signal is displayed.

Figure 4A:
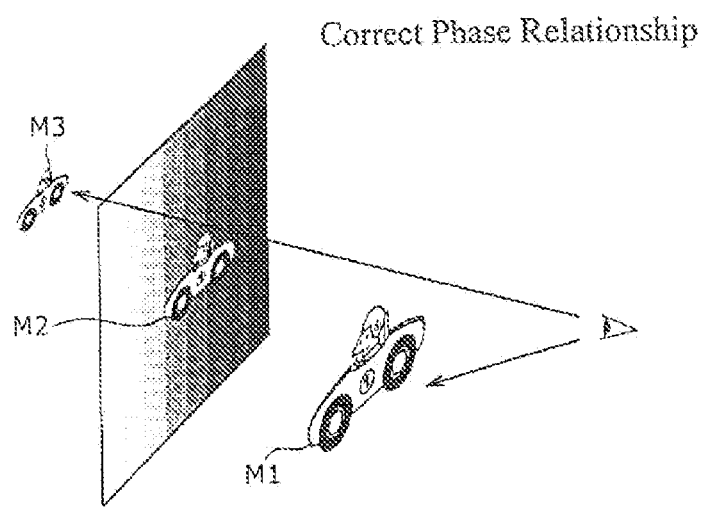
FIGS. 4A and 4B are explanatory diagrams illustrating the display of left and right images at correct positions and at interchanged positions according to the first embodiment of the present invention.
Figure 4B:
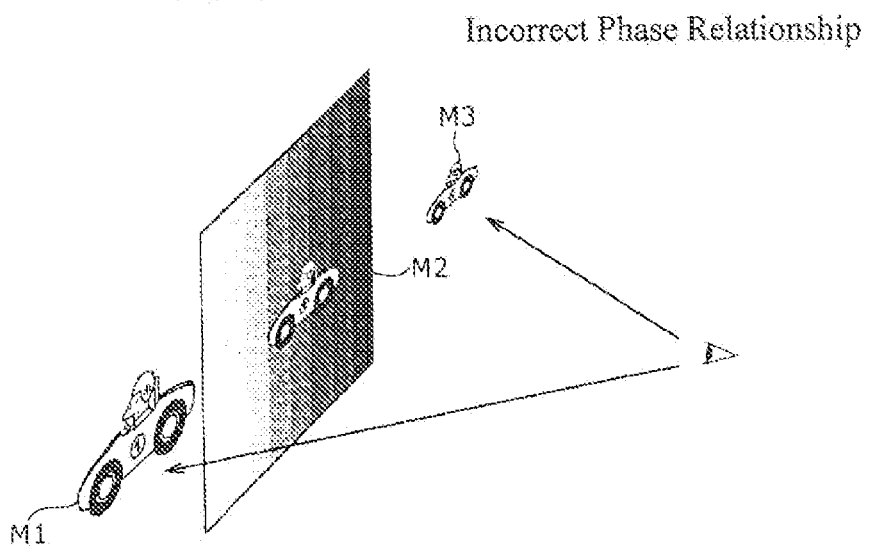

FIGS. 4A and 4B illustrate how the image, obtained by combining the color bar signal with the objects M1, M2 and M3, looks when displayed.

FIG. 4A is an example in which the left and right channel signals are displayed in a correct phase relationship. That is, at this time, the largest object M1 is displayed forward, with the objects M2 and M3 displayed to look gradually farther away with reduction in size. Therefore, the image appears with no sense of discomfort, showing a match between the object sizes and the sense of perspective.

In contrast, FIG. 4B illustrates the left and right channel signals that are displayed in an interchanged, incorrect phase relationship. In this case, the largest object M1 is displayed at the farthermost position, with the objects M2 and M3 displayed to look gradually closer with reduction in size as illustrated in FIG. 4B. This results in an image with a sense of discomfort, showing a mismatch between the object sizes and the sense of perspective.

The image displayed as shown in FIG. 4B occurs as a result of wrong connection such as incorrect cabling in one of the connections shown in FIG. 1. Therefore, if the operator watching the monitor feels a sense of discomfort from the image shown in FIG. 4B, he or she finds that there is a wrong connection. As a result, the operator can check the cabling or take other necessary actions.

Although a marker signal is superimposed on a color bar signal in the example shown in FIG. 3, marker signals may be superimposed on the actual left and right channel video signals captured by the camera devices. Further, the objects M1, M2 and M3 displayed by a marker signal are merely examples, and objects in other forms may be displayed.

Still further, in order to make clearer the correct manner in which the objects should be displayed, a marker signal may be used that causes the object M1 to be marked "front" and the object M3 "backmost."

[2. Second Embodiment]

A description will be given next of examples according to a second embodiment of the present invention with reference to FIGS. 5 to 10B. In FIGS. 5 to 10B, like devices to those shown in FIGS. 1 to 4B described in relation to the first embodiment are denoted by the same reference numerals.

In the second embodiment, the present invention is applied to division of a video signal into two paths of video signals for transmission. That is, a video signal to be transmitted includes a link channel A video signal, i.e., a first video signal component, and a link channel B video signal, i.e., a second video signal component, allowing for the video signal of each channel to be processed. If the signals of the link channels A and B are interchanged due, for example, to incorrect cabling, this erroneous interchange between the channels is obvious from the displayed image.

[2.1 Connections]

A description will be given first of an example of connections in the present embodiment with reference to FIG. 5.

In this example, a camera device 10 is made available which obtains a video signal with an ultrahigh resolution by imaging. The camera device 10 splits the video signal into two video signals, i.e., link channel A and B signals, outputting these two signals. Although described in more detail later, the link channel A and B signals each contain alternate horizontal lines.

The output video signals of two channels of the camera device 10 are supplied to a video signal processor (camera control device 30) at the subsequent stage via respective cables. The monitoring device 50 is connected to the camera control device 30 to display an image captured by the camera device 10. Further, an unshown recorder or transmitter is connected to the camera control device 30 to record or deliver the video signal obtained by the camera device 10. Still further, the control panel 40 is connected to the camera control device 30.

It should be noted that a monitor used as the monitoring device 50 has a resolution high enough to display the video signal, obtained by imaging with the camera device 10, with the same number of horizontal lines.

Figure 5:
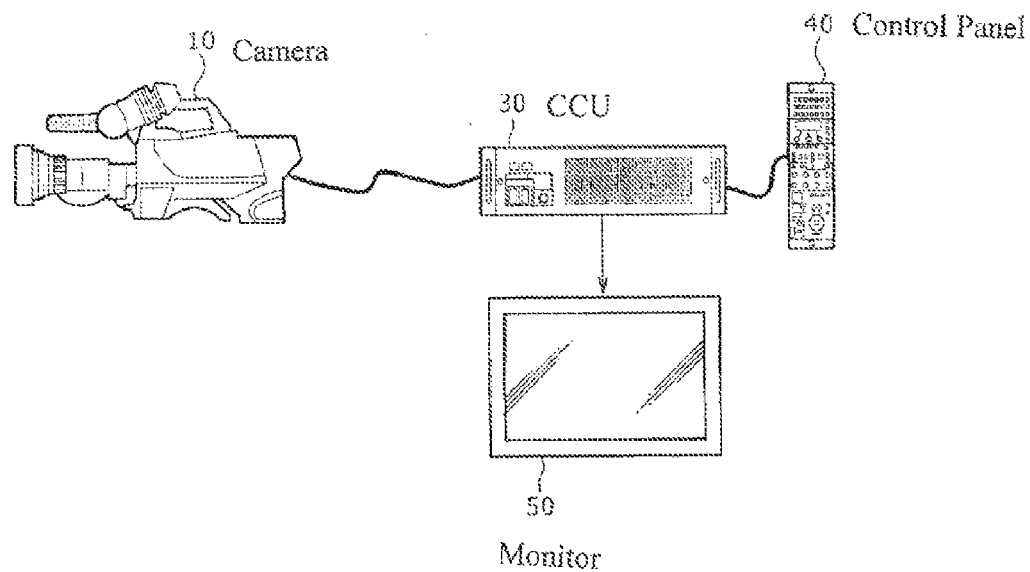
FIG. 5 is an explanatory diagram illustrating an example of connections according to a second embodiment of the present invention.

In the present embodiment, specific marker signals are superimposed on the video signals of the link channels A and B with the devices connected as illustrated in FIG. 5. The marker signals are combined with the video signals in the camera device 10 shown in FIG. 5. Alternatively, the marker signals may be combined with the video signals in the camera control device 30. The marker signals are superimposed to make it obvious from the displayed image whether the signals of the link channels A and B are interchanged due, for example, to incorrect cabling.

[2.2 Device Configuration]

Figure 6:
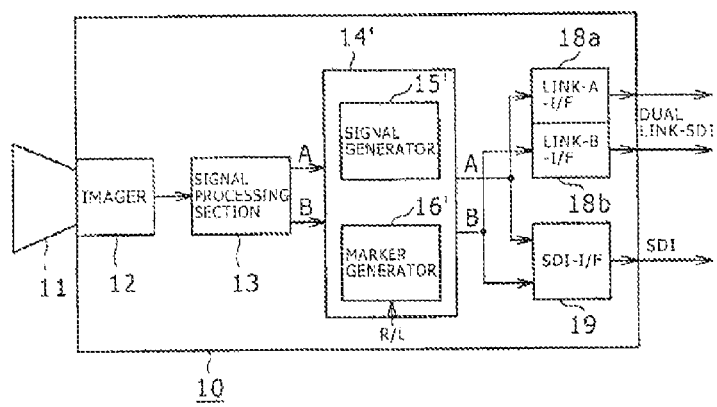
FIG. 6 is a block diagram illustrating an example of device configuration according to a second embodiment of the present invention.

FIG. 6 is a diagram illustrating a device configuration related to the present embodiment.

As illustrated in FIG. 6, the camera device 10 obtains an electric imaging signal by capturing image light that falls on the imager 12 via the lens 11 and supplies the image signal to the signal processing section 13.

The signal processing section 13 performs necessary processes on the imaging signal supplied from the imager 12, thus converting the imaging signal into a video signal in a given format. The converted video signal is supplied to a combining process section 14' where the video signal is combined with a marker signal.

The combining process section 14' includes a signal generator 15' and marker generator 16'. The signal generator 15' generates predetermined video signals including test pattern signal. The marker generator 16' generates a marker signal that causes objects serving as marks to appear in an image. The marker generator 16' combines a marker signal with the image at the position specified by the camera device control section (not shown). A marker signal may be combined with an image derived from the video signal obtained as a result of imaging or with an image of a test pattern signal generated by the signal generator 15'.

It should be noted that the combining process section 14' combines marker and video signals only when instructed to do so by the control section of the camera device. The combining process section 14' may be instructed to combine marker and video signals by a command issued from other device such as the control panel 40 shown in FIG. 5.

The video signals output from the combining process section 14' are output from interface sections 18a and 18b as dual link SDI signals of the link channels A and B.

Alternatively, the video signals output from the combining process section 14' may be output from an interface section 19 as an SDI signal of a single path.

It should be noted that although the configuration of only the camera device 10 is shown in FIG. 6, the combining process section 14' may be provided, for example, in the camera control device 30 so that video signals are combined with marker signals in the same manner as in the camera device 10.

Figure 7A:
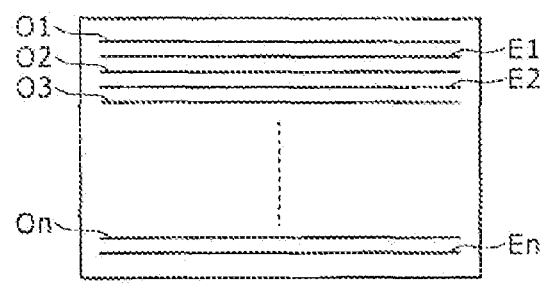
FIGS. 7A to 7C are explanatory diagrams illustrating the composition of a video signal according to the second embodiment of the present invention.
Figure 7B:
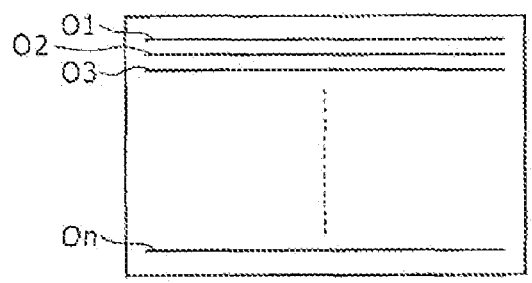
Figure 7C:
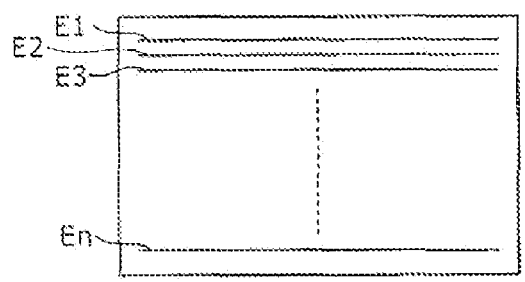

A description will be given here of the link channel A and B video signals making up the dual link SDI signals. First, we assume that the original image obtained by imaging with the camera device 10 contains odd horizontal lines O1, O2, O3, . . . , On and even horizontal lines E1, E2, E3, . . . , En arranged alternately as illustrated in FIG. 7A. We assume, at this time, that the link channel A video signal contains only the signals of the odd horizontal lines O1, O2, O3, . . . , On.

Further, we assume that the link channel B video signal contains only the signals of the even horizontal lines E1, E2, E3, . . . , En.

Then, when these dual link SDI signals are displayed, for example, on the monitoring device 50, the original image reconstructed by combining the signals of two channels is displayed. That is, the video signal is displayed that contains the horizontal lines reconstituted as illustrated in FIG. 7A.

[2.3 Combined Status of Marker and Video Signals and Display Status of Combined Signal]

A description will be given next of the combined status of marker and video signals with reference to FIGS. 8 to 10B.

Figure 8:
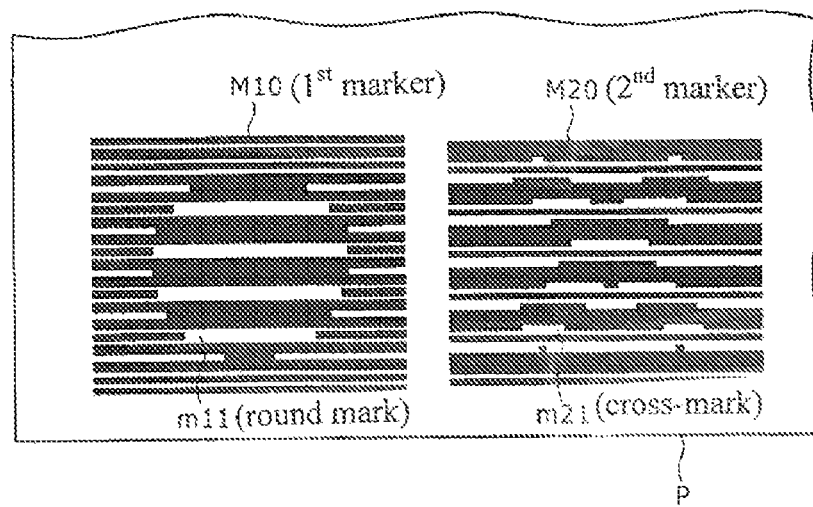
FIG. 8 is an explanatory diagram illustrating a display example of an image with a superposed marker signal according to the second embodiment of the present invention.

FIG. 8 illustrates in an enlarged fashion the manner in which objects M10 and M20 displayed by a marker signal are displayed at predetermined positions in an image.

In the example shown in FIG. 8, the objects M10 and M20 are displayed side by side at the lower left corner of the image.

Here, the object M10 contains a round mark m11 at the center that appears clearly when the horizontal lines of the link channel A and B video signals making up the dual link SDI signals are displayed in a correct arrangement. The round mark m11 appears unclearly if adjacent horizontal lines are interchanged. On the other hand, the object M20 contains a cross mark m21 at the center that appears clearly if the horizontal lines of the link channel A and B video signals making up the dual link SDI signals are displayed in an interchanged, incorrect arrangement. The cross mark m21 appears unclearly when the horizontal lines are displayed in a correct arrangement.

In the example shown in FIG. 8, the horizontal lines are displayed in a correct arrangement. Therefore, the round mark m11 appears clearly in the object M10, whereas the cross mark m21 appears unclearly in the object M20 in a manner difficult to identify.

The round mark m11 and cross mark m21 appear clearly and unclearly by such a line arrangement because the manner in which the combination of the lines, each shown in one of two colors, is changed, thus changing the intervals (frequency) at which the vertical colors change by means of the display status.

FIG. 8 illustrates the actual display status with the white and black lines. For example, however, the line-by-line display status of the object M10 is shown in an enlarged fashion in FIG. 9.

Figure 9:
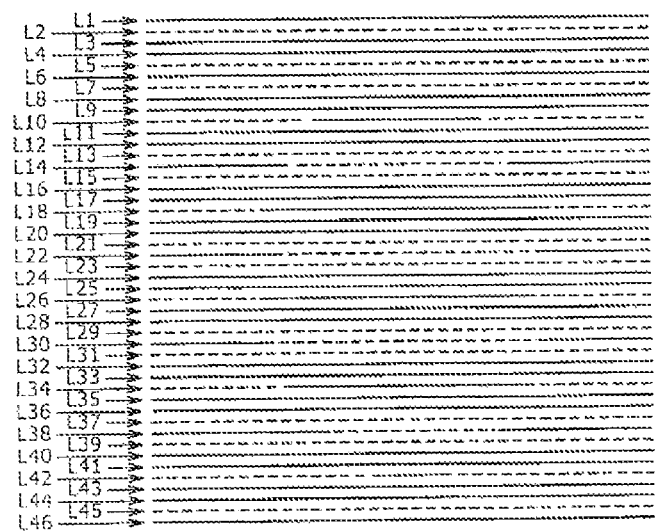
FIG. 9 is an explanatory diagram illustrating the line configuration of the marker signal according to the second embodiment of the present invention.

The horizontal lines shown by solid lines in FIG. 9 are the black horizontal lines shown in FIG. 8, and the horizontal lines shown by dashed lines the white horizontal lines shown in FIG. 8. As illustrated in FIG. 9, the object M10 is made up of 46 horizontal lines or lines L1 to L46.

As is clear from FIG. 9, when we look vertically at the position where the round mark m11 of the object M10 is located, five black horizontal lines appear consecutively in some areas, and three white horizontal lines appear consecutively in other areas. These areas appear alternately. Further, the white and black lines are arranged alternately around the round mark m11, with two consecutive black lines and one white line arranged adjacent to each other in some areas and one black line and one white line arranged adjacent to each other in other areas.

Therefore, five consecutive black lines and three consecutive white lines are displayed at relatively wide intervals in the round mark m11, and white and black lines are displayed at narrow intervals around the round mark m11 so that the round mark appears clearly.

FIG. 9 illustrates a correct arrangement of lines. If the adjacent odd and even lines of the 46 horizontal lines or lines L1 to L46 are interchanged, the arrangement of consecutive black lines and that of consecutive white lines change in the round mark m11. The number of lines of each color also changes around the round mark m11, making it difficult to distinguish between the round mark m11 and its surrounding areas. It should be noted that the term "odd and even lines are interchanged" refers to the fact the lines L1 and L2 are interchanged, and each of the succeeding odd lines is interchanged with the even line that follows. A display example with interchanged lines will be described with reference to FIGS. 10A and 10B.

Although only the object M10 is shown in FIG. 9, the cross mark m21 is also displayed in the same line arrangement in the object M20 shown in FIG. 8. It should be noted, however, that the cross mark m21 appears clearly if the adjacent horizontal lines are interchanged. When displayed in a correct arrangement shown in FIG. 8, the cross mark m21 appears with the white and black lines arranged almost in the same manner as around the cross mark m21, making the cross mark m21 appear unclearly.

Figure 10A:
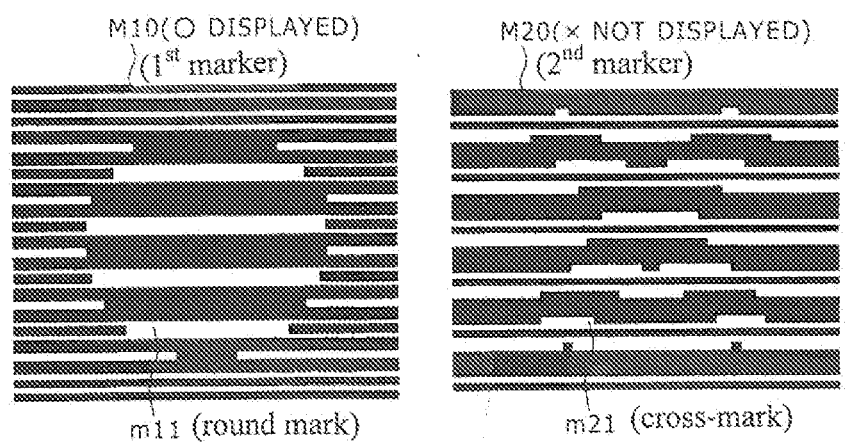
FIGS. 10A and 10B are explanatory diagrams respectively illustrating an image with a superposed marker signal displayed correctly and in an interchanged arrangement.
Figure 10B:
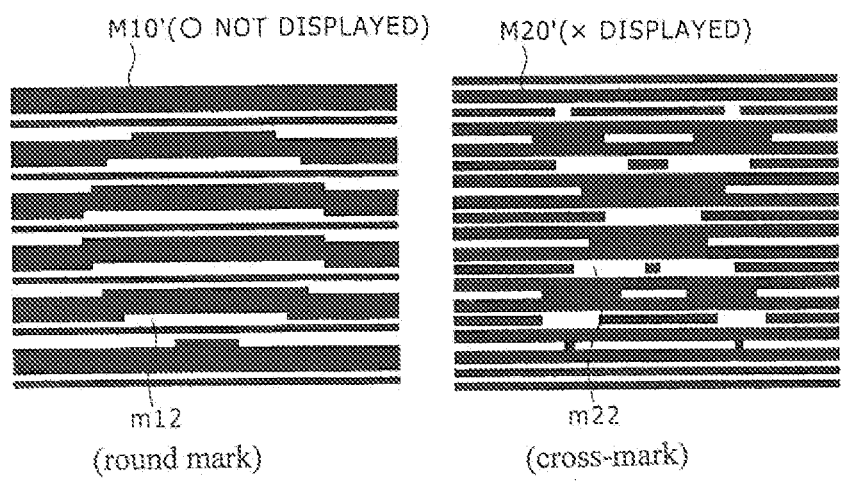

FIGS. 10A and 10B are diagrams respectively illustrating the objects M10 and M20 displayed in a correct line arrangement and in an arrangement of odd and even lines interchanged with each other.

When the objects M10 and M20 are displayed in a correct line arrangement shown in FIG. 10A, these objects appear in the same manner as already described with reference to FIG. 8. The round mark m11 appears clearly in the object M10 with its white and black lines arranged differently from those around the round mark m11. On the other hand, the cross mark m21 appears unclearly in the object M20 with its white and black lines arranged roughly in the same manner as those around the same mark m21.

If the objects M10 and M20 are displayed in an arrangement of odd and even lines interchanged with each other as shown in FIG. 10B, the round mark m12 appears unclearly in the object M10' with its white and black lines arranged roughly in the same manner as those around the round mark m12. That is, there is only one isolated black line in some areas of the round mark m12, and there are four consecutive black lines in other areas thereof. Where there is only one isolated black line, this line is continuous with the surrounding black line. Further, where there are four consecutive black lines, these lines are continuous and connected with the surrounding four consecutive black lines with a level difference of one line. As a result, the round mark m12 has colors arranged in the same manner as therearound, making the round mark m12 inconspicuous and unclear.

The object M20' is displayed in the manner opposite to the object M10'. That is, when the object M20 is displayed in a correct line arrangement shown in FIG. 10A, the cross mark m21 appears unclearly with its white and black lines arranged roughly in the same manner as those around the cross mark m21. In contrast, if the object M20' is displayed in an arrangement of odd and even lines interchanged with each other as shown in FIG. 10B, the cross mark m22 appears clearly in the object M20' with its white and black lines arranged differently from those around the cross mark m22, making the cross mark m22 appear clearly.

As described above, the present embodiment makes it easy to determine, from the statuses of the objects appearing on the screen as a result of superimposition of a marker signal, whether the link channel A and B video signals making up the dual link SDI signals are transmitted correctly. That is, when the objects M10 and M20 are displayed at the lower left corner of the image as illustrated in FIG. 8, the operator watching the objects M10 and M20 on the monitoring device can readily determine whether the cabling is correct by determining which of the round and cross marks is clearly visible.

In particular, the present embodiment displays the round or cross mark clearly by displaying relatively wide lines made up of five consecutive horizontal lines of the same color (black) so as to make the round or cross mark stand out from the surrounding areas. Therefore, a high resolution video signal having a large number of horizontal lines provides an excellent image display that permits easy distinction thanks to horizontal lines appearing over relatively large areas. This makes it possible to verify the transmission line connections of dual link signals, commonly used as high resolution video signals transmitted at a high transmission rate, in a reliable and easy manner by simply viewing the displayed images with no need for processes performed by circuitry.

It should be noted that although black and white lines are used in combination in the example shown in FIG. 8, other colors may also be used in combination. When black and white lines are used in combination, the display luminance is changed. However, the color component is changed depending on the combination of display colors.

On the other hand, the shapes of the displayed marks shown in FIG. 8 are merely an example. Other shapes may be displayed so long as a distinction can be made by interchanging the horizontal lines in the same manner. For example, the letters "OK" may appear clearly in a correct arrangement of horizontal lines, and the letters "NG" in an incorrect arrangement thereof.

Further, although two objects, one appearing clearly in a correct arrangement of horizontal lines and another appearing clearly in an incorrect arrangement thereof, are displayed side by side in the example shown in FIG. 8, only one of the two objects may be displayed.

Still further, although a description has been given of a dual link signal split into two paths of video signals, the same processes are also applicable when a dual link signal is split into three or more paths for transmission, recording and so on.

The present application contains subject matter related to that disclosed in Japanese Priority Patent Application JP 2009-291062 filed in the Japan Patent Office on Dec. 22, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A video signal processor comprising:
a combining process section adapted to superimpose a first marker signal on a first video signal component at a specific position and superimpose a second marker signal on a second video signal component at roughly the same position as the specific position; and
a control section adapted to control the condition of superimposition of the first and second marker signals so that display of (a) a first image having a predetermined depth perspective of the marker signals indicates connection cables between components of the video signal processor are correctly connected wherein the first and second marker signals are combined correctly when the first and second video signal components are combined in a correct phase relationship, and (b) a second image having another depth perspective of the marker signals, different from the first image, indicates the connection cables are incorrectly connected wherein the first and second marker signals are combined incorrectly when the first and second video signal components are combined in an incorrect phase relationship.

2. The video signal processor of claim 1, wherein
the first and second video signal components are those components for left and right channels making up a stereoscopic image,
the first and second marker signals cause a plurality of objects to be displayed, and
when the left and right channel video signals are combined and displayed in a correct phase relationship under control of the control section, the plurality of objects are stereoscopically displayed from front to back in a given sequence, and if the left and right channel video signals are combined and displayed in an incorrect phase relationship, the plurality of objects are stereoscopically displayed in a disordered sequence different from the given sequence.

3. The video signal processor of claim 2, wherein
the plurality of objects are sized differently, and
when the objects are displayed in a correct phase relationship, the larger object is stereoscopically displayed more forward than the smaller object, and if the objects are displayed in an incorrect phase relationship, the smaller object is stereoscopically displayed more forward than the larger object.

4. The video signal processor of claim 3, wherein
the first and second video signal components are test pattern signals, and the test pattern signals are combined with the marker signals adapted to cause the plurality of objects to be displayed.

5. The video signal processor of claim 1, wherein
the first video signal component is made up of odd horizontal lines of a video signal of each frame and the second video signal component is made up of even horizontal lines of the video signal of each frame,
when the first and second video signal components are combined and displayed in a correct arrangement of horizontal lines under control of the control section, the objects displayed by the marker signals appear in a first form, and if the first and second video signal components are combined and displayed in an incorrect arrangement of horizontal lines, the objects displayed by the marker signals appear in a second form, and
display statuses in the first and second forms are achieved by changing the intervals at which the vertical color or luminance is changed by the interchange of horizontal lines.

6. The video signal processor of claim 5, wherein
the display status in the first form is that in which an object appears clearly, and the display status in the second form is that in which an object appears unclearly.

7. The video signal processor of claim 6, wherein
an object different from the object appears unclearly in the display status in the first form, and clearly in the display status in the second form.

8. A video signal processing method comprising the steps of:
superimposing a first marker signal on a first video signal component at a specific position and superimposing a second marker signal on a second video signal component at roughly the same position as the specific position; and
controlling the condition of superimposition of the first and second marker signals so that display of (a) a first image having a predetermined depth perspective of the marker signals indicates connection cables between components of a video signal processor are correctly connected wherein the first and second marker signals are combined correctly when the first and second video signal components are combined in a correct phase relationship, and (b) a second image having another depth perspective of the marker signals, different from the first image, indicates the connection cables are incorrectly connected wherein the first and second marker signals are combined incorrectly when the first and second video signal components are combined in an incorrect phase relationship.

9. The video signal processing method of claim 8, wherein
the first and second video signal components are those components for left and right channels making up a stereoscopic image,
the first and second marker signals cause a plurality of objects to be displayed, and
when the left and right channel video signals are combined and displayed in a correct phase relationship, the plurality of objects are stereoscopically displayed from front to back in a given sequence, and if the left and right channel video signals are combined and displayed in an incorrect phase relationship, the plurality of objects are stereoscopically displayed in a disordered sequence different from the given sequence.

10. The video signal processing method of claim 8, wherein
the first video signal component is made up of odd horizontal lines of a video signal of each frame and the second video signal component is made up of even horizontal lines of the video signal of each frame,
when the first and second video signal components are combined and displayed in a correct arrangement of horizontal lines, the objects displayed by the marker signals appear in a first form, and if the first and second video signal components are combined and displayed in an incorrect arrangement of horizontal lines, the objects displayed by the marker signals appear in a second form, and
display statuses in the first and second forms are achieved by changing the intervals at which the vertical color or luminance is changed by the interchange of horizontal lines.

11. A video signal processor comprising:
combining process means for superimposing a first marker signal on a first video signal component at a specific position and superimposing a second marker signal on a second video signal component at roughly the same position as the specific position; and
control means for controlling the condition of superimposition of the first and second marker signals so that display of (a) a first image having a predetermined depth perspective of the marker signals indicates connection cables between components of the video signal processor are correctly connected wherein the first and second marker signals are combined correctly when the first and second video signal components are combined in a correct phase relationship, and (b) a second image having another depth perspective of the marker signals, different from the first image, indicates the connection cables are incorrectly connected wherein the first and second marker signals are combined incorrectly when the first and second video signal components are combined in an incorrect phase relationship.

* * * * *